(12) United States Patent
Sho et al.

(10) Patent No.: US 7,338,138 B2
(45) Date of Patent: Mar. 4, 2008

(54) LINK AND PRODUCING METHOD OF THE SAME

(75) Inventors: Tomoyoshi Sho, Kyotanabe (JP); Tatsuo Yamashita, Yawata (JP)

(73) Assignee: Komatsu Ltd., Tokyo (JP)

( * ) Notice: Subject to any disclaimer, the term of this patent is extended or adjusted under 35 U.S.C. 154(b) by 181 days.

(21) Appl. No.: 11/210,797

(22) Filed: Aug. 25, 2005

(65) Prior Publication Data
US 2006/0043791 A1 Mar. 2, 2006

(30) Foreign Application Priority Data
Aug. 27, 2004 (JP) .............................. 2004-247765

(51) Int. Cl.
*B62D 55/205* (2006.01)
*C21D 1/18* (2006.01)
(52) U.S. Cl. ..................... 305/201; 305/198; 148/663
(58) Field of Classification Search ................ 305/185, 305/192, 193, 194, 195, 196, 198, 200, 201; 29/DIG. 49; 148/663
See application file for complete search history.

(56) References Cited

U.S. PATENT DOCUMENTS

| | | | | |
|---|---|---|---|---|
| 3,955,855 A | * | 5/1976 | Massieon et al. | ........... 305/192 |
| 4,419,152 A | * | 12/1983 | Grilli et al. | .................. 148/649 |
| 4,813,750 A | * | 3/1989 | Erlenmaier et al. | ......... 305/194 |
| 5,500,058 A | * | 3/1996 | Hirakawa et al. | ........... 148/649 |
| 5,704,697 A | * | 1/1998 | Ketting et al. | ............... 305/193 |
| 7,040,080 B2 | * | 5/2006 | Okawa et al. | ................ 59/35.1 |
| 2006/0017323 A1 | * | 1/2006 | Wodrich et al. | ............. 305/202 |
| 2006/0181151 A1 | * | 8/2006 | Wodrich et al. | ............. 305/201 |

FOREIGN PATENT DOCUMENTS

JP 2002-362441 12/2002
JP 2004-17782 1/2004

OTHER PUBLICATIONS

Tomoyosi Morita et al., entitled "*Practical Machine Series Bulldozer*", Nonpatent Literature 1, 1969, p. 70.

* cited by examiner

*Primary Examiner*—Russell D. Stormer
*Assistant Examiner*—Kip Kotter
(74) *Attorney, Agent, or Firm*—Wenderoth, Lind & Ponack, L.L.P.

(57) ABSTRACT

A link has link connecting bores (15) and (16) at both ends thereof and a wear rail (13) disposed between the upper portions of the link connecting bores (15) and (16). Portions near the ends of the wear rail (13) are designed to have a hardness smaller than that of a center portion of the wear rail. Accordingly, the portions near the ends of the wear rail can be abraded more easily than the center portion of the wear rail. Since the portions near the ends of the wear rail, in which the portions are easily abraded, are positioned closer to the link connecting bores, abrasion loss in use is smaller than that of the center portion owing to its structure. So, the difference in abrasion amount makes it possible to lower a level irregularity of the wear rail.

6 Claims, 7 Drawing Sheets

LINK AND PRODUCING METHOD OF THE SAME

FIELD OF THE INVENTION

The present invention relates to a link constituting a crawler belt equipped for a track-type work machine and a producing method of the same. More particularly, the present invention relates to a link capable of lowering a level irregularity of a wear rail of the link owing to abrasion and a producing method of the same.

BACKGROUND OF THE INVENTION

Figure 5:
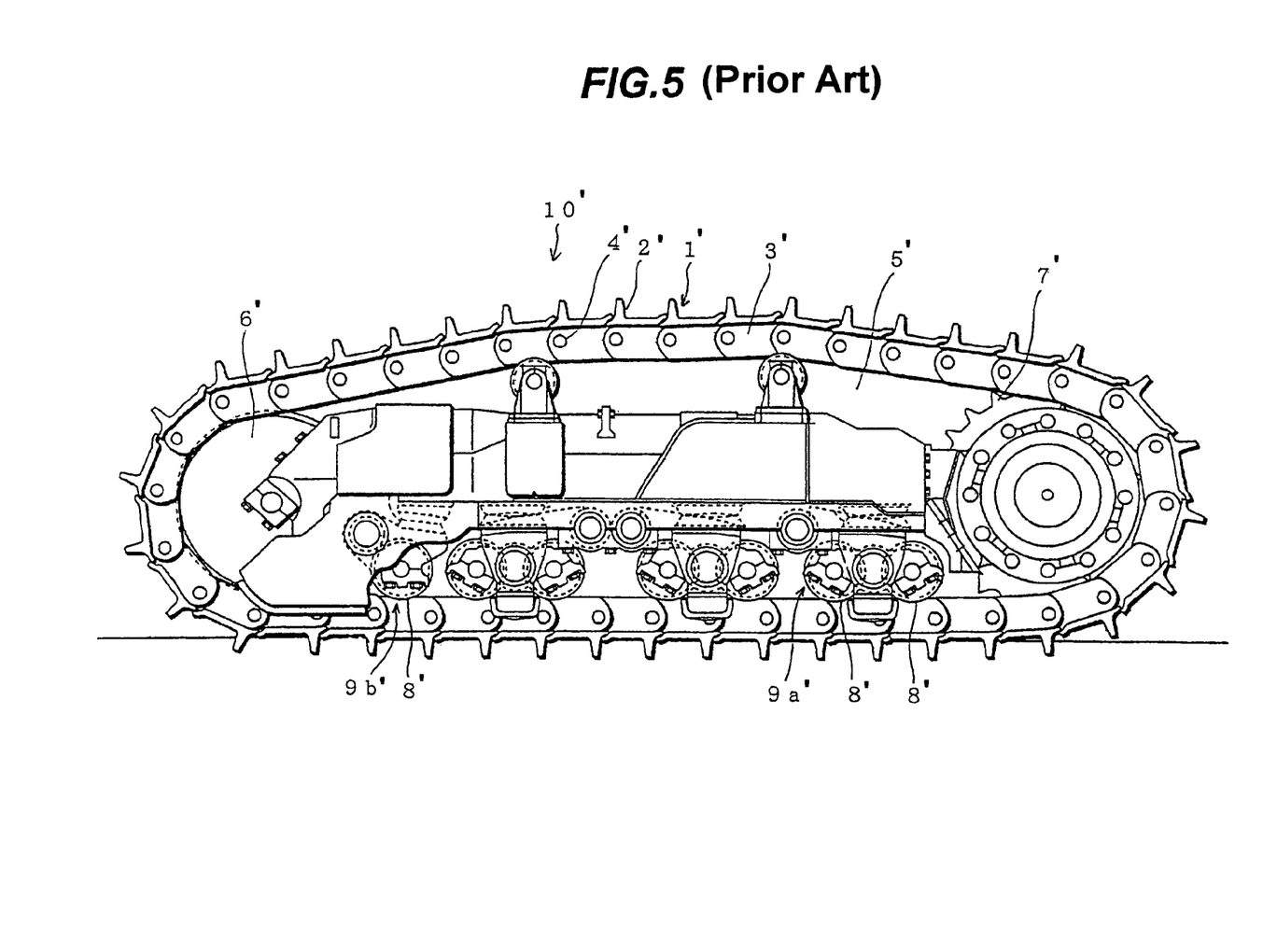
FIG. 5 is a side view showing a structure of a running gear equipped with a link.

FIG. 5 is a side view showing a structure of a running gear equipped with a link.

A track-type work machine is equipped with a pair of running gears 10, shown in FIG. 5, at the right and left sides of the lower part thereof. The running gear 10 has a crawler belt 1. The crawler belt 1 is constructed such that a plurality of links 3 are circularly interlinked by connecting pins 4, in which a shoe plate 2 is fixed to each of the links 3 by a bolt.

The running gear 10 is provided with a track frame 5 disposed in the longitudinal direction of the work machine, and an idler tumbler 6 and a sprocket wheel 7 which are rotatably mounted to the front and the back of the track frame 5, respectively. In addition, three pair of roller devices 9a, each having a pair of front and back track rollers 8, and a roller device 9b, having a track roller 8, are mounted to the lower part of the track frame 5 between the idler tumbler 6 and the sprocket wheel 7, wherein each roller 8 is swingable in a vertical direction and rotatably supported to the track frame 5. Each roller 8 of the track roller devices 9a and 9b rolls in contact with a wear rail of the link of the crawler belt (referring to a patent literature 1).

Figure 6:
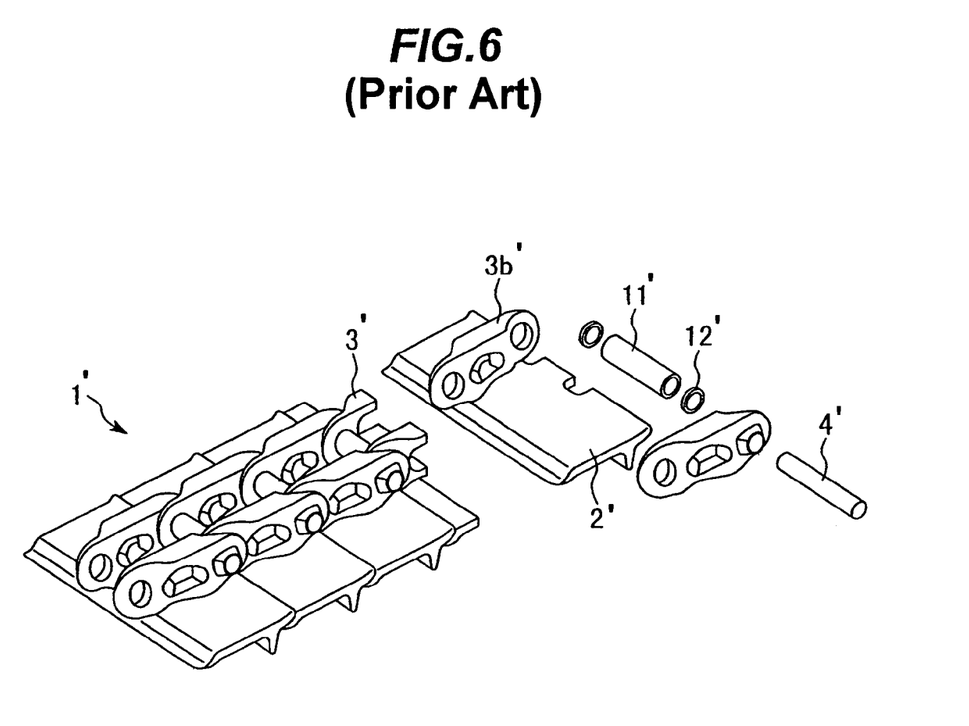
FIG. 6 is a partially exploded perspective view showing the crawler belt of FIG. 5.

FIG. 6 is a partially exploded perspective view showing the crawler belt of FIG. 5.

The crawler belt 1 is composed of the shoe plate 2, the link 3, a bushing 11, the connecting pin 4 and a dust seal 12. Each element is coupled to each other, as shown in FIG. 6, such that the bushing 11 is tightly forced into the link 3 and then the connecting pin 4 is slackly fitted into the bushing 11. Then, the connecting pin 4 is tightly forced into another link 3b arranged at the outside of the former link 3 and coupled thereto. The crawler belt 1 bends between the bushing 11 and the pin 4 (referring to a nonpatent literature 1).

Figure 7A:
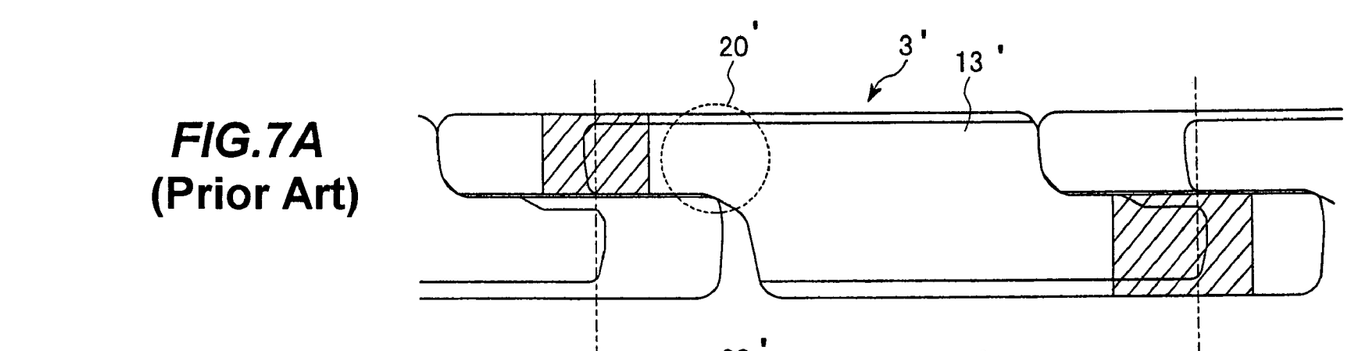
FIG. 7A is a plane view showing the wear rail of the link of FIG. 6.
Figure 7B:
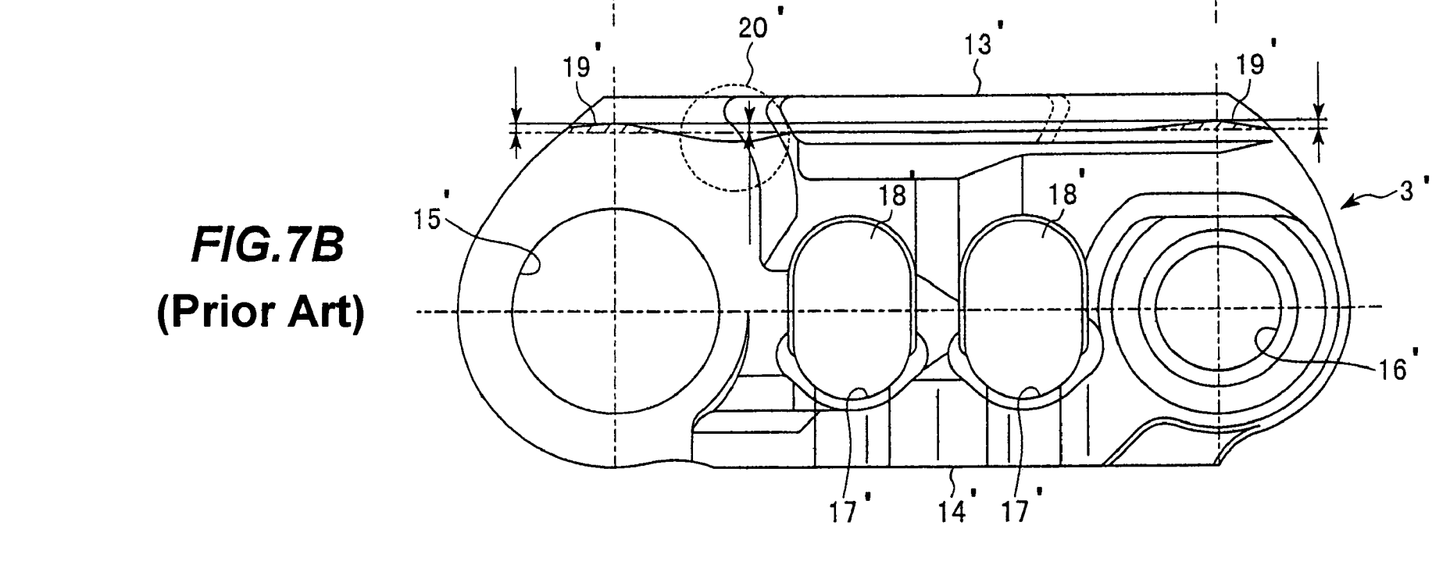
FIG. 7B is a side view showing the link provided with the wear rail shown in FIG. 7A.

FIG. 7A is a plane view showing the wear rail of the link of FIG. 6, and FIG. 7B is a side view showing the link provided with the wear rail shown in FIG. 7A.

The link 3 is formed with the wear rail 13 which supports the weight of the machine at the upper surface and also rolls in contact with the track roller (represented by reference number 8 in FIG. 5), as shown in FIG. 7B. In addition, the idler tumbler treads on the wear rail 13. Further, the link 3 is formed with a shoe-mounting surface 14, to which the shoe plate 2 is mounted, at the opposite side of the wear rail 13. Furthermore, the link 3 is formed with a bushing-forcing bore (a link connecting bore) 15, in which the bushing 11 is forced, at one end thereof, and with a pin-insertion bore (a link connecting bore) 16, in which the pin 4 is fitted, and a seal counter bore (not shown), in which the dust seal 12 is fitted, at the other end thereof, wherein the pin-insertion bore 16 and the seal counter bore are concentricity aligned. In addition, the link 3 is formed with a bolt-insertion bore (not shown), in which a bolt is fitted for mounting the shoe plate 2, and with seats 17, each on which a nut for mounting the shoe plate 2 is seated. A window 18 is a space for seating the nut (referring to a patent literature 2).

Patent literature 1: Japanese Patent Publication No. 2002-362441 (paragraphs 22 to 27, FIG. 1)
Patent literature 2: Japanese Patent Publication No. 2004-17782 (paragraph 15, FIG. 2)
Nonpatent literature 1: "Practical machine series bulldozer" Tomoyosi Morita, Sangyou Tosho Syuppann, (1969), p 70.

SUMMARY OF THE INVENTION

The machine sometimes vibrates during driving. Such vibration is partly caused by a level irregularity of the wear rail 13 of the link 3 owing to abrasion of the wear rail 13. When the link contacts a roller, such as a track roller, or an idler tumbler during driving of the crawler belt, the link butts against the roller or the idler tumbler, causing abrasion of the wear rail of the link.

A conventionally used link has the following characteristics: a wear rail thereof has uniform hardness in the entire surface thereof; bearing stress applied on the wear rail differs depending on the width of the wear rail; and, the wear rail of the link partially contacts the roller or the idler tumbler because of its structure. So, as the abrasion proceeds, a level irregularity of the wear rail of the link will be caused. Incidentally, the wear rail does not contact an outer surface of the idler tumbler at a portion over the pin 4. This is because, when the crawler belt is wound around the idler tumbler, the links of the crawler belt are folded around the link pins 4 and contact the idler tumbler with the crawler belt being bent into a polygonal shape. Thus, the wear rail of the link, which is a side of the polygon, contacts the idler tumbler at the center portion thereof in the link connecting direction, but not at a portion over the link pin 4. Alternatively, when the link contacts the roller, the wear rail of the link hardly contacts the roller at a portion over the link pin 4 for the same reason. However, the portion at which the wear rail structurally contacts with the roller differs from the portion with the idler tumbler. The roller has an outer diameter smaller than the idler tumbler. So, the wear rails of two of the links 3 connected by one of the link pins 4 butt against the roller at portions over the link pin 4; the wear rail butts against the idler tumbler at the center portion thereof. In a case of a crawler belt winded into an elliptical shape, abrasion loss of the wear rail owing to butting against the idler tumbler is smaller than abrasion loss thereof owing to butting against the roller.

The level irregularity of the wear rail of the link will be explained.

As shown in FIGS. 7A and 7B, in the wear rail 13 of the link 3, since portions 19 over the link connecting bores 15 and 16 do not structurally contact the idler tumbler and the roller, abrasion loss thereof is smaller than that of a center portion of the wear rail 13. As a result, the portions 19 above the link connecting bores become convex about 4 mm high with respect to the center portion of the wear rail. On the other hand, a portion 20 positioned closer to the center of the wear rail above one link connecting bore (the bushing-forcing bore) 15 is narrower in width than the center portion of the wear rail, as shown in FIG. 7A, resulting in large abrasion loss. As a result, the portions 20 become hollow (concave) about 4 mm deep with respect to the center portion of the wear rail.

As the level irregularity of the wear rail becomes large, the machine will widely vibrate. Thus, maintenance work is necessary for grinding the wear rail of the link so as to be even. In addition, after several maintenances, the link comes to the end of abrasion life, whereby the link is necessarily replaced with a new one. Accordingly, it is required to extend abrasion life and to reduce maintenance costs by lowering a level irregularity of a wear rail of a link.

The present invention is directed in view of the above-described circumstances, and therefore an object of the invention is to provide a link capable of lowering a level irregularity of a wear rail of the link owing to abrasion and a producing method of the link.

A link in the present invention has a wear rail, wherein the wear rail is designed such that a portion with small abrasion loss in use has a hardness smaller than that of a portion with large abrasion loss in use.

According to the link in the present invention, in the wear rail, the portion with small abrasion loss in use can be abraded more easily than the portion with large abrasion loss in use. Accordingly, a level irregularity of the wear rail owing to abrasion can be reduced.

A link in the present invention has link connecting bores at both ends thereof and a wear rail disposed between an upper portion of one of the link connecting bores and an upper portion of the other link connecting bore, wherein portions near both ends of the wear rail are designed to have a hardness smaller than that of a center portion thereof.

According to the link in the present invention, the portions near the ends of the wear rail can be abraded more easily than the center portion thereof. Since the portions near the ends are easy to be abraded and are positioned near the link connecting bores, abrasion loss in use is smaller than that of the center portion owing to its structure. Accordingly, the difference in abrasion loss makes it possible to lower a level irregularity of the wear rail.

A producing method of a link in the present invention is a method for producing a link having link connecting bores at both ends thereof and a wear rail disposed between an upper portion of one of the link connecting bores and the other link connecting bore, wherein portions near the ends of the wear rail are tempered at higher temperatures than a center portion thereof.

According to the producing method of a link in the present invention, since the portions near the ends of the wear rail are tempered at higher temperatures than the center portion thereof, the portions near the ends of the wear rail will have a hardness smaller than that of the center portion thereof. Accordingly, the difference in abrasion loss in use between the portions makes it possible to lower a level irregularity of the wear rail.

This specification includes embodiments, drawings and claims disclosed in Japanese Patent Application No. 2004-247765 filed Aug. 28, 2004.

EFFECT OF THE INVENTION

As described above, according to the present invention, a link capable of lowering a level irregularity of a wear rail thereof owing to abrasion and a producing method of the link is provided.

DETAILED DESCRIPTION OF THE INVENTION

Hereinafter, preferred embodiments of the present invention will be concretely described referring to the drawings.

Figure 1A:
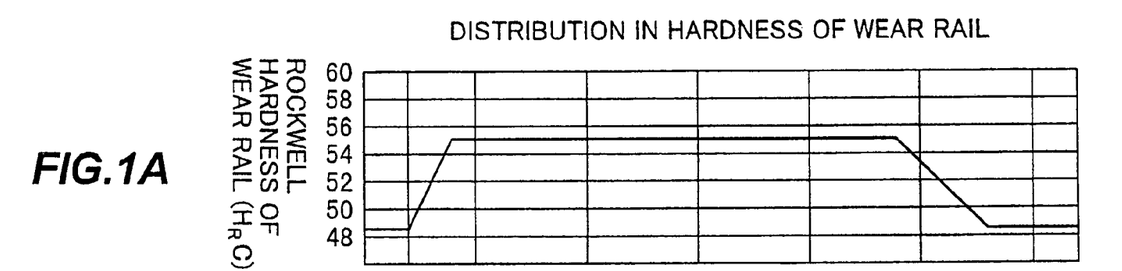
FIG. 1A is a graph showing a distribution in hardness of a wear rail of a link according to one embodiment of the present invention.
Figure 1B:
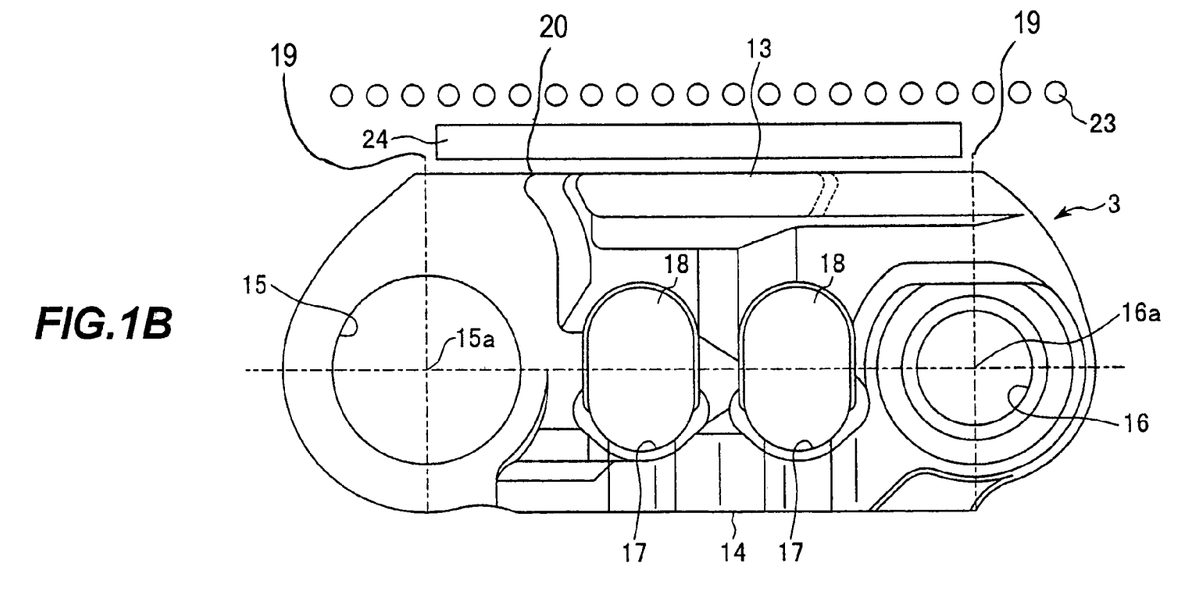
FIG. 1B is a side view showing the link equipped with a wear rail having the distribution in hardness showing in FIG. 1A.

FIG. 1A is a graph showing a distribution in hardness of a wear rail of a link according to one embodiment of the present invention, and FIG. 1B is a side view showing the link equipped with a wear rail having the distribution in hardness showing in FIG. 1A. In the link according to this embodiment, the same parts as those of a conventionally used link are represented by the same numbers and explanations thereof are omitted.

In a track-type work machine, a crawler belt 1 is elliptically winded around a sprocket wheel 7, an idler tumbler 6 and track rollers 8, as shown in FIG. 5. The crawler belt 1 is composed of a crawler chain constructed such that a plurality of links 3 are endlessly interlinked at ends thereof by connecting pins 4, in which a shoe plate 2 is fixed to one surface of each of the links. As shown in FIG. 1B, the link 3 is formed with a bushing-forcing bore (a link connecting bore) 15, at one end thereof, and with a pin-inserting bore (a link connecting bore) 16, at the other end thereof. The link 3 is provided with a wear rail 13 disposed between the upper portions of the bushing-forcing bore 15 and the pin-inserting bore 16. The wear rail 13 is formed with a flat surface opposite to a shoe-mounting surface 14 to which the shoe plate 2 is mounted.

While a wear rail of a conventionally used link is designed to have uniform hardness in the entire surface, the wear rail of the link according to this embodiment is designed to have a hardness with a distribution shown in FIG. 1A. In other words, the wear rail 13 in the present invention is designed to have various hardnesses therein. In detail, portions near the ends of the wear rail 13 are designed to have a hardness smaller than that of a center portion thereof. Accurately, each of the portions near the ends of the wear rail 13 is positioned closer to the end from a position above each of a center 15a and 16a of the bushing-forcing bore 15 and the pin-inserting bore 16. Further, the portions near the ends of the wear rail have a width narrower than that of the center portion thereof (shown in FIG. 7A). The portions near the ends of the wear rail 13 contact the track roller 8 during driving of the crawler belt. The wear rail 13 also contacts the idler tumbler 6 at a center portion in the longitudinal direction thereof, shown in FIG. 7A, in addition to the track roller 8, during driving of the crawler belt. Since abrasion loss of a portion where the wear rail 13 contacts the idler tumbler 6 is commonly smaller than that of a portion where the wear rail 13 contacts the track roller 8, there is no difference in hardness between the portions in this embodiment. However, when abrasion loss of the portion where the wear rail contacts the idler tumbler 6 is considerably high, it is preferable that the wear rail has various hardnesses therein in the same manner described above.

The portions near the ends of the wear rail 13 of the link preferably have a Rockwell hardness number C scale (HRC) smaller than that of the center portion thereof by 3 points or more. In this embodiment, as shown in FIG. 1A, the portions near the ends of the wear rail 13 have a Rockwell hardness number C scale of 48.5; the center portion thereof has a Rockwell hardness number C scale of 55.

Next, a producing method of the link 3 will be explained.

First, a round bar or a square bar made of a high toughness abrasion-resistant steel is prepared as a material. The high toughness abrasion-resistant steel contains carbon of 0.30 to 0.45 wt %, Si of 0.10 to 0.50 wt %, Mn of 0.30 to 1.20 wt %, P of 0.010 wt % or less, S of 0.010 wt % or less, Cr of 0.50 to 1.40 wt %, Mo of 0.15 to 0.55 wt %, B of 0.0005 to 0.0050 wt %, Sol. Al of 0.015 to 0.060 wt % and Nb of 0.02 to 0.05 wt % and/or Ti of 0.10 to 0.03 wt % and a residue substantively made of iron Then, the material is subjected to a hot forging treatment so as to produce a link material having a substantially finished shape.

After natural cooling the link material for lowering its hardness, the link material becomes easily workable. Then, a necessary machining is applied to the link material so as to form the wear rail 13, the shoe mounting surface 14, the bushing-forcing bore 15, the pin-inserting bore 16, the seal counter bore, the bolt-insertion bore and the shoe nut seat. At such a time, portions requiring dimensional accuracy, such as the bushing-forcing bore 15, the pin-inserting bore 16 and the seal counter bore, should be subjected to only a crude machining. On the contrary, portions requiring normal tolerance, such as the wear rail 13, the shoe mounting surface 14, a shoe bolt insertion bore and the shoe nut seat, and portions requiring less dimensional accuracy other than the aforesaid portions may be treated with a substantively proper finish machining as well as a crude machining. The portion, which is to be treated with the machining and also has the same dimensional tolerance as that treated with the crude machining after forming by the hot forging, may not be treated with the machining.

Then, the link material to which the machining is employed is subjected to a heat treatment described below. The link material is rapidly cooled down from 750° C. or more (preferably 850° C.), using water, oil, soluble oil and equivalent quenching agent, thereby to quench the whole link material. In addition, the link material is treated with a low-temperature tempering treatment for tempering at a temperature range of 150° C. to 300° C. such that a martensite structure, which is formed by the quenching treatment, will not be destroyed. Specifically, the portions near the ends of the wear rail 13 of the link material are tempered at higher temperatures than the center portion thereof. Such heat treatment allows the whole of the link material to be hardened and to have the distribution in hardness, shown in FIG. 1A, from the wear rail 13 to a center core thereof (the depth of about 30 mm).

Figure 2:
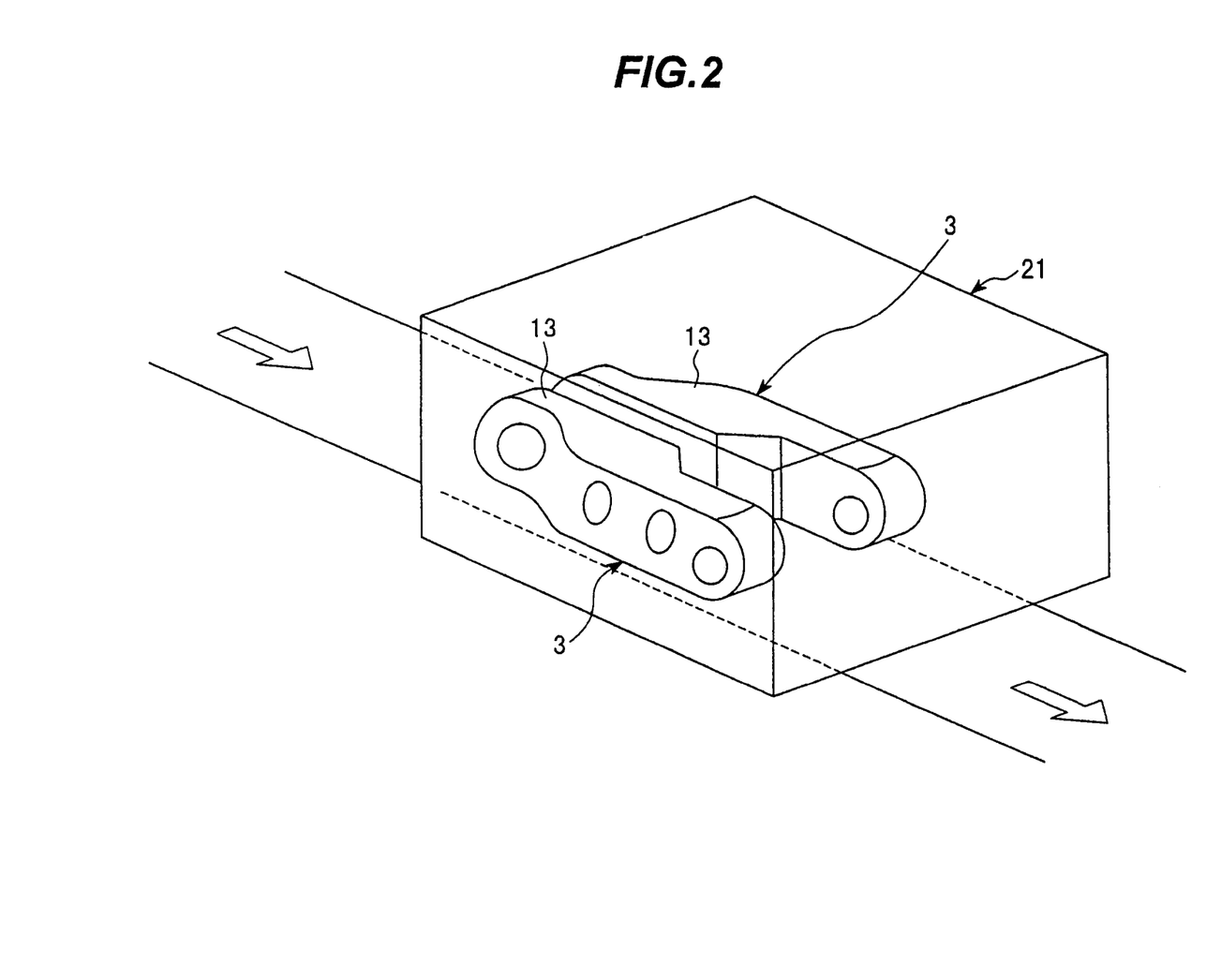
FIG. 2 is a perspective view schematically showing a structure of a tempering equipment for tempering a link.
Figure 3:
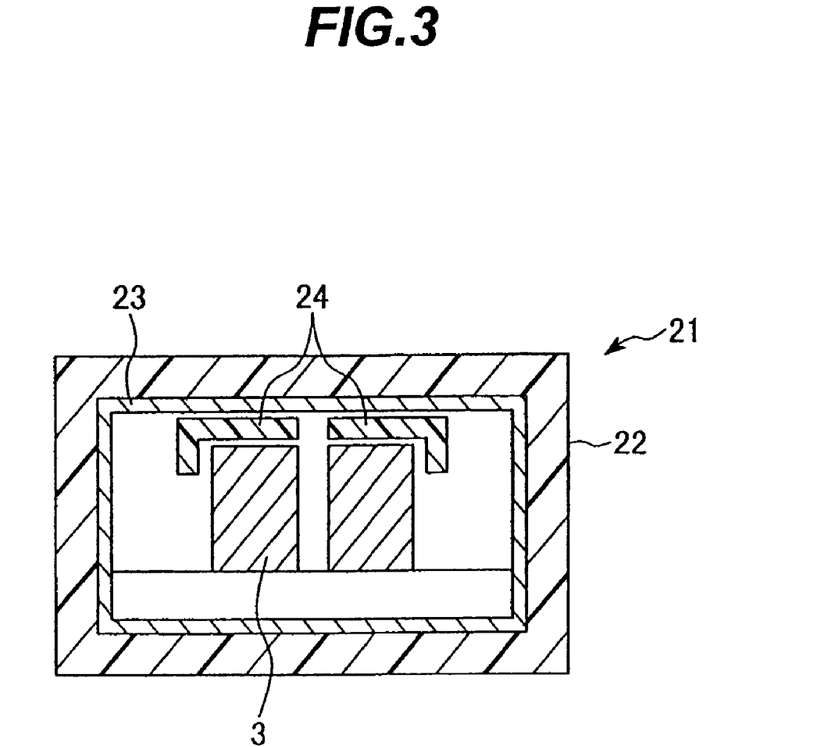
FIG. 3 is a cross-sectional view showing the tempering equipment of FIG. 2.

The low-temperature tempering treatment will be explained referring to FIG. 1 to FIG. 3. FIG. 2 is a perspective view schematically showing a structure of a tempering equipment for tempering a link. FIG. 3 is a cross-sectional view showing the tempering equipment of FIG. 2.

As shown in FIG. 2, the link 3 is carried to the tempering equipment 21 and retained in the equipment for a predetermined period. The tempering equipment 21 has a casing 22, shown in FIG. 3, in which a low-frequency coil 23 is coiled along an inner wall of the casing. Applying a voltage to the coil 23 generates eddy current by which the link placed in the coil is heated. In such a case, as shown in FIG. 3 and FIG. 1A, a portion other than the portions near the ends of the wear rail 13 is covered with an insulator 24 about 15 mm thick. In other words, the insulator 24 is arranged between the coil 23 and the portion other than the portions near the ends of the wear rail 13. Therefore, the portion covered with the insulator 24 is tempered at lower temperatures than the portions not covered with the insulator. Specifically, the portions near the ends of the wear rail 13 (the portions not covered with the insulator) of the link 3 are tempered at about 180° C.; the center portion of the wear rail 13 (the portion covered with the insulator) is tempered at about 280° C. Accordingly, as shown in FIG. 1A, the portions near the ends of the wear rail 13 can have a Rockwell hardness number C scale of 48.5; the center portion of the wear rail 13 can have a Rockwell hardness number C scale of 55.

After the tempering treatment, the link 3 is removed from the tempering equipment 21, and another succeeding link is carried thereto. Repeating such a treatment allows a plurality of links to be tempered.

Various types of insulators may be used for the insulator 24. In particular, silicon steel plate is preferred.

The tempering equipment for tempering the link is not limited to what is shown in FIG. 2 and FIG. 3, and another type of tempering equipment may be used. For example, it is possible that the entire surface of the wear rail of the link is tempered at 180° C. and then the portions near the ends of the wear rail are re-heated at 280° C. to be tempered. In addition, it is also possible to change the number of turns of the coil 23 shown in FIG. 1B. In such a case, the number of turns of the coil close to the portions near the ends of the wear rail increases; the number of turns of the coil close to portion other than the portions near the ends of the wear rail decreases. In this manner, adjusting tempering temperatures by changing the number of turns of the coil allows providing various hardnesses in the wear rail without use of the insulator 24.

According to this embodiment, the portions near the ends of the wear rail 13 of the link 3 are tempered at higher temperatures than the center portion thereof. As a result, the portions near the ends of the wear rail will have a hardness lower than that of the center portion. The portions near the ends of the wear rail do not contact the roller and the idler tumbler structurally and therefore abrasion loss thereof is smaller than that of the center portion thereof. In addition, a portion over the link connecting bore 15 closer to the center of the wear rail 13 is narrower in width than the center portion thereof resulting in larger abrasion loss. Accordingly, by lowering the hardness of the portions near the ends of the wear rail 13 in order to be lower than that of the center portion thereof so as to provide a difference in abrasion loss, a level irregularity of the wear rail 13 will be reduced. As a result, an interval of maintenance for grinding the wear rail 13 of the link 3 so as to be even will be extended and abrasion life of the link will also be extended. Accordingly, maintenance costs can be reduced, and the link will be used close to its abrasion limit whereby the frequency of replacement of the link will be reduced, resulting in cost reduction. Further, since the level irregularity of the wear rail 13 will be lowered, oscillation of the machine will be decreased.

Figure 4A:
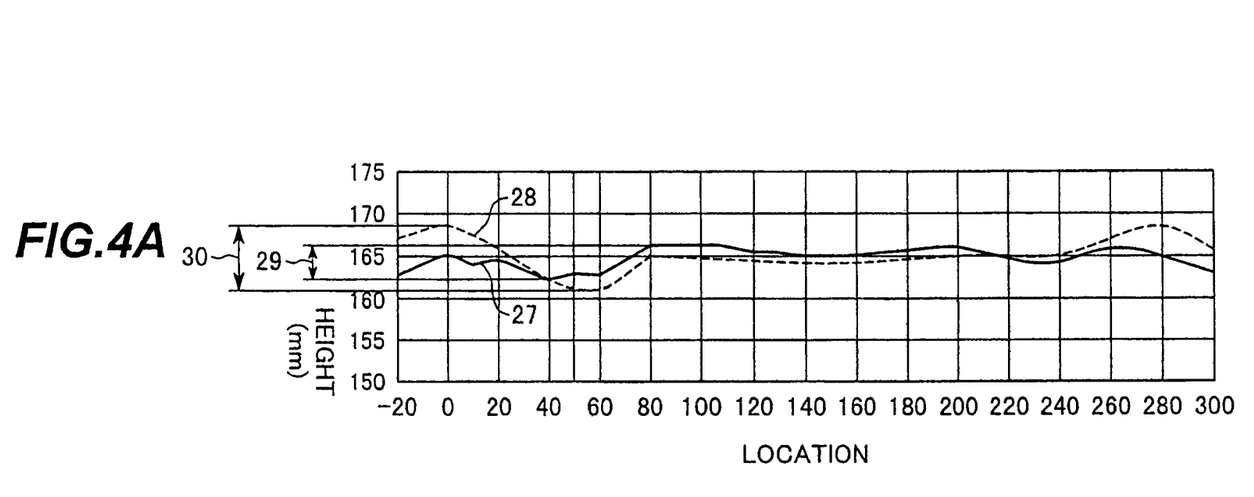
FIG. 4A is a graph showing abrasion amount irregularity of each wear rail shown in FIG. 4B.
Figure 4B:
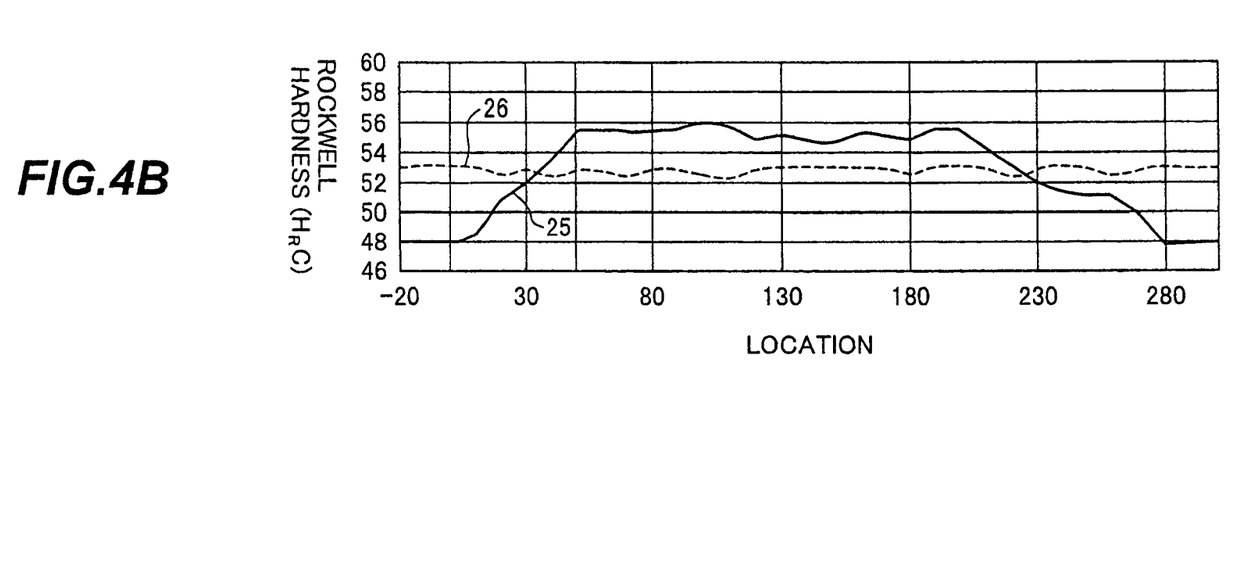
FIG. 4B is a graph showing distributions in hardness of a wear rail of a link produced by a producing method according to this embodiment and a wear rail of a conventionally used link.

FIG. 4B is a graph showing distributions in hardness of a wear rail of a link produced by a producing method according to this embodiment and a wear rail of a conventionally used link. FIG. 4A is a graph showing an abrasion amount irregularity of each wear rail shown in FIG. 4B after running using the running gear shown in FIG. 5 for a predetermined period.

In FIG. 4B, reference number 25 indicates a distribution in a Rockwell hardness number C scale of a wear rail of the link produced by a producing method according to this embodiment, and reference number 26 indicates a distribution in a Rockwell hardness number C scale of the wear rail of the conventionally used link. In FIG. 4A, reference number 27 indicates an abrasion loss of the wear rail having the Rockwell hardness distribution represented by reference number 25, and reference number 28 indicates an abrasion loss of the wear rail having the Rockwell hardness distribution represented by reference number 26.

As shown FIG. 4A and FIG. 4B, it is confirmed that providing various hardnesses to the wear rail of the link, according to this embodiment, causes a difference in abrasion loss of the wear rail in use resulting in lowering a level irregularity of the wear rail. Specifically, the link provided with the wear rail having various hardnesses gives a level irregularity 29 of about 4 mm by abrasion; the link provided with the wear rail having uniform hardnesses gives a level irregularity 30 of about 8 mm by abrasion. Accordingly, the link according to this embodiment can reduce a level irregularity of the wear rail to about half of that of a conventionally used link.

The invention is not be considered limited to what is shown and described in the specification without departing from the scope of the invention.

What is claimed is:

1. A link to be provided with a shoe plate and to be circularly connected by pins for constituting a crawler chain in a crawler belt, the crawler belt being wound around a sprocket wheel, an idler tumbler and a roller for a track-type work machine, the link comprising:
   a mounting surface to which the shoe plate is to be mounted; and
   a wear rail made of a uniform material and positioned opposite to said mounting surface,
   wherein said wear rail comprises a surface having a contact portion arranged so as to contact the idler tumbler or the roller in a longitudinal direction during driving of the crawler belt, wherein a portion of said surface other than said contact portion has a hardness less than that of said contact portion, and wherein the hardness of said portion of said surface other than said contact portion decreases continuously toward a longitudinal end of said wear rail.

2. A link to be connected for constructing a circular crawler chain in a crawler belt equipped for a track-type work machine, the link comprising:
   link connecting bores at two longitudinal end portions of the link, respectively; and
   a wear rail made of a uniform material and disposed between an upper portion of one of the link connecting bores and an upper portion of the other link connecting bore, and
   wherein portions of said wear rail at longitudinal ends of said wear rail have a hardness less than that of a center portion of said wear rail, and wherein the hardness of said portions of said wear rail at said longitudinal ends of said wear rail decreases continuously toward said longitudinal ends of said wear rail, respectively.

3. A link according to claim 2, wherein a Rockwell hardness number C scale of said portions of said wear rail at said longitudinal ends of said wear rail is less than that of said center portion of said wear rail by 3 points or more.

4. A link according to claim 2, wherein each of said portions of said wear rail at said longitudinal ends of said wear rail is arranged closer to a respective longitudinal end than is a respective position on said wear rail located outwardly from a center of a respective one of said link connecting bores, the portions of said wear rail at said longitudinal ends of said wear rail being narrower in width than said center portion of said wear rail.

5. A link according to claim 4, wherein a Rockwell hardness number C scale of said portions of said wear rail at said longitudinal ends of said wear rail is less than that of said center portion of said wear rail by 3 points or more.

6. A method of producing a link to be connected so as to construct a circular crawler chain in a crawler belt equipped for a track-type work machine,
   wherein the link has link connecting bores at two end portions thereof and a wear rail disposed between an upper portion of one of the link connecting bores and an upper portion of the other link connecting bore, the method comprising:
   tempering portions of the wear rail at the ends of the wear rail at a temperature higher than a temperature at which the center portion of the wear rail is tempered, wherein each of the portions at the ends of the wear rail is positioned closer to a respective one of the ends than is a respective position on said wear rail located outwardly from a center of a respective one of the link connecting bores.

* * * * *